(12) United States Patent
Shi

(10) Patent No.: US 7,561,583 B2
(45) Date of Patent: Jul. 14, 2009

(54) METHOD OF REALIZING COMMUNICATING BETWEEN MODULES OF SYSTEM DEVICES

(75) Inventor: Xinming Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 505 days.

(21) Appl. No.: 10/520,691

(22) PCT Filed: Apr. 24, 2003

(86) PCT No.: PCT/CN03/00300

§ 371 (c)(1),
(2), (4) Date: Jul. 26, 2005

(87) PCT Pub. No.: WO2004/006591

PCT Pub. Date: Jan. 15, 2004

(65) Prior Publication Data

US 2006/0165048 A1    Jul. 27, 2006

(30) Foreign Application Priority Data

Jul. 8, 2002  (CN) ................................ 02 1 23683

(51) Int. Cl.
*H04L 12/28* (2006.01)
(52) U.S. Cl. ...................................... 370/398; 370/422
(58) Field of Classification Search .................. 370/398, 370/422
See application file for complete search history.

(56) References Cited

U.S. PATENT DOCUMENTS

| | | | |
|---|---|---|---|
| 4,968,977 A | 11/1990 | Chinnaswamy et al. | |
| 5,428,813 A | 6/1995 | Simmering et al. | |
| 5,920,699 A | 7/1999 | Bare | |
| 5,974,487 A | 10/1999 | Hartmann | |
| 6,438,625 B1 | 8/2002 | Olson | |
| 6,510,056 B1 * | 1/2003 | Kusyk et al. | 361/752 |
| 6,519,225 B1 * | 2/2003 | Angle et al. | 370/229 |
| 6,693,901 B1 * | 2/2004 | Byers et al. | 370/362 |
| 6,697,368 B2 * | 2/2004 | Chang et al. | 370/395.1 |
| 6,763,023 B1 | 7/2004 | Gleeson et al. | |

(Continued)

FOREIGN PATENT DOCUMENTS

CN    1193878    9/1998

(Continued)

*Primary Examiner*—Chirag G Shah
*Assistant Examiner*—Otis L Thompson, Jr.
(74) *Attorney, Agent, or Firm*—Harness, Dickey & Pierce, P.L.C.

(57) ABSTRACT

The invention discloses a communication method for modules within device. The method sets a centralized exchanging and controlling unit in the device, and every module is connected with the centralized exchanging and controlling unit through its own communication control interface. When a message is sending from one module to another module, first the source module sends the message to the centralized exchanging and controlling unit, after processing in the centralized exchanging and controlling unit the message is forwarded to the destination module defined in the message. Since every module is directly connected with the centralized exchanging and controlling unit in a high-speed link, so any two modules communication with the following advantages: high reliability, to locate a fault point is easier, number of the modules that take part in the communication is unlimited, the system design is simple, easier and flexible.

16 Claims, 3 Drawing Sheets

U.S. PATENT DOCUMENTS 6,792,515 B2 * 9/2004 Smith .................. 711/153
6,807,175 B1 * 10/2004 Jennings et al. ........... 370/390
6,876,654 B1 4/2005 Hegde
2002/0080775 A1 * 6/2002 Engbersen et al. ........ 370/352

FOREIGN PATENT DOCUMENTS

WO    WO 0008834    2/2000

* cited by examiner

METHOD OF REALIZING COMMUNICATING BETWEEN MODULES OF SYSTEM DEVICES

FIELD OF THE TECHNOLOGY

The invention relates to the internal communication within devices, especially a method of realizing communicating between modules of system devices.

BACKGROUND OF THE INVENTION

In larger devices, such as transmission facilities, exchange devices and wireless base stations etc., the modules have direct or indirect connection, so it is necessary to communicate between the modules frequently. The communication information includes not only those for normal service, but also those for maintenance, such as alarm, fault detection etc.

At present, there are two ways for communication between modules in devices:

The first way is to communicate through a mailbox, as shown in FIG. 1. The control module 101 is connected with every module 102 through the data bus, address bus and control bus, and because the mailbox can bi-directional communicate, the control module 101 can make communication with every module 102.

The second way is shown in FIG. 2. The control module 201 is connected with every module 202 through the 485 buses, and the communication can be implemented through the 485 buses between the module 201 and every module 202, or between different modules of 202.

Although the bus mode of the above two ways has a simple structure that is easy to implement, and supports various protocols, but there are several disadvantages as follow: the load capacity of a bus is limited, so it does not support communication of many modules; if a fault happens at a point, it is easier that the whole bus cannot communicate or the communication reliability become worse, and also it is difficult to locate the fault point; furthermore, since there are many connection lines, the backplane circuit design and layout are complex.

SUMMARY OF THE INVENTION

In view of the above-mentioned facts, objective of the invention is to provide a method of realizing communicating between modules of system devices in order that a large amount of modules can reliably communicate with each other and a fault is easy to be located.

To archive the above objective, technical scheme of the invention is as follow:

A method of realizing communicating between modules of system devices, wherein:

Setting a centralized exchanging and controlling unit in device;

Connecting the centralized exchanging and controlling unit with every module through its own communication control interface in the device;

When communicating between the modules, sending the message to the centralized exchanging and controlling unit by a source module, processing the message by the centralized exchanging and controlling unit, and forwarding the processed message to a destination module by the centralized exchanging and controlling unit.

The method further comprising:

Broadcasting the message by the centralized exchanging and controlling unit, comparing the destination address of the message with its own address by each module in device, and if the two addresses are identical, receiving the message by the module.

The method further comprising:

Presetting address pins of each module, and getting its own address by reading the current state of address pins by each module.

The method further comprising:

Presetting the state of address pins in each module by setting the voltage state on the backplane circuit.

Wherein:

Sending the message from a source module to a destination module directly through exchanging by the centralized exchanging and controlling unit.

In the invention, every module is directly connected with the centralized exchanging and controlling unit with high-speed communication control interfaces, so comparing with the present technique, the invention can implement any two modules communication, achieve high reliability, locate a fault point easily, also, because of the invention, the number of the modules that take part in the communication is unlimited, the system design is simple, easier and flexible.

EMBODIMENTS OF THE INVENTION

The invention will be described in more detail with reference to drawings and embodiments.

Figure 1:
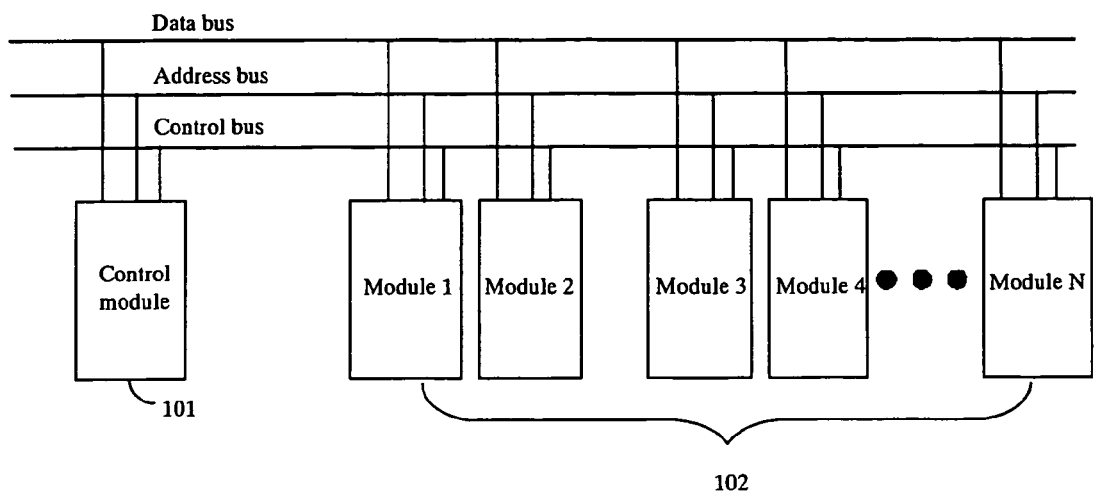
FIG. 1 shows a structure diagram of one way that implements communication between the modules with the present technique.
Figure 2:
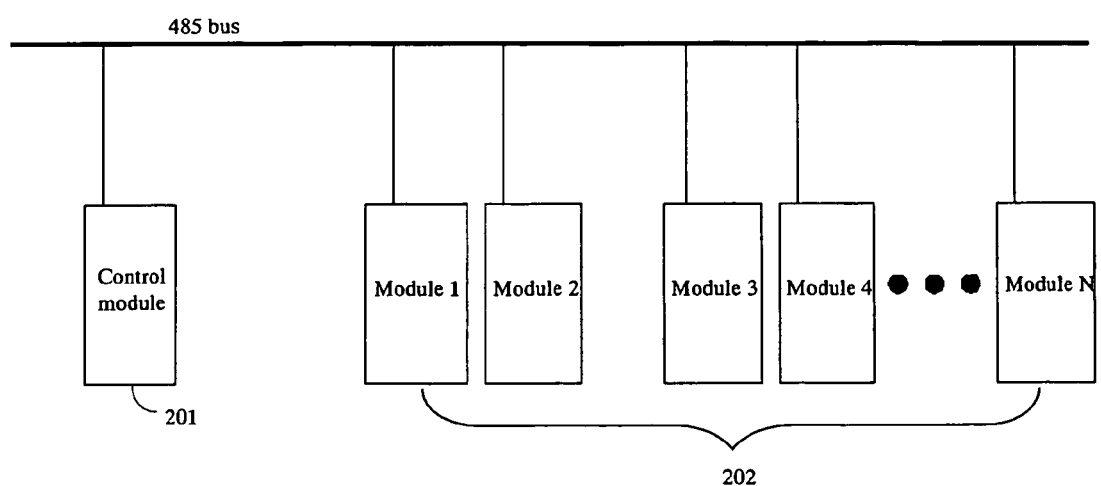
FIG. 2 shows a structure diagram of another way that implements communication between the modules with the present technique.
Figure 3:
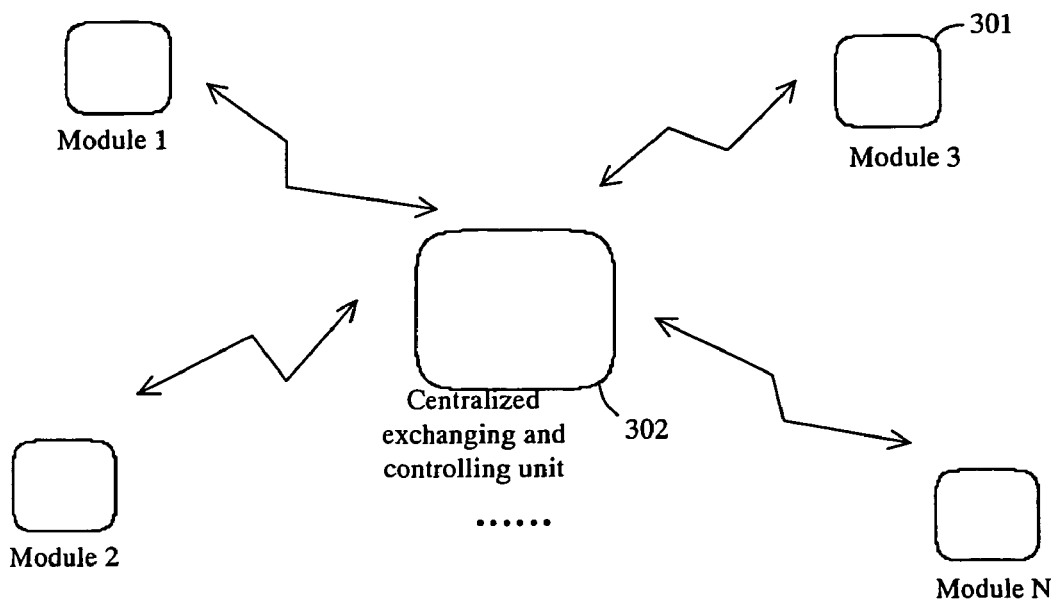
FIG. 3 shows the system structure diagram of the invention.

FIG. 3 shows a system structure diagram of the invention. In this diagram, modules 1 to N are modules 301 that need to communicate with each other within the device, and every module is connected with the centralized exchanging and controlling unit 302, respectively. During communication, a message is transmitted from a source module of the modules 301 to the centralized exchanging and controlling unit 302, the centralized exchanging and controlling unit 302 processes the message and then forwards the processed message to the destination module in the modules 301. Said message includes not only service message, but also maintenance message, such as alarm and fault detection messages etc.

Figure 4:
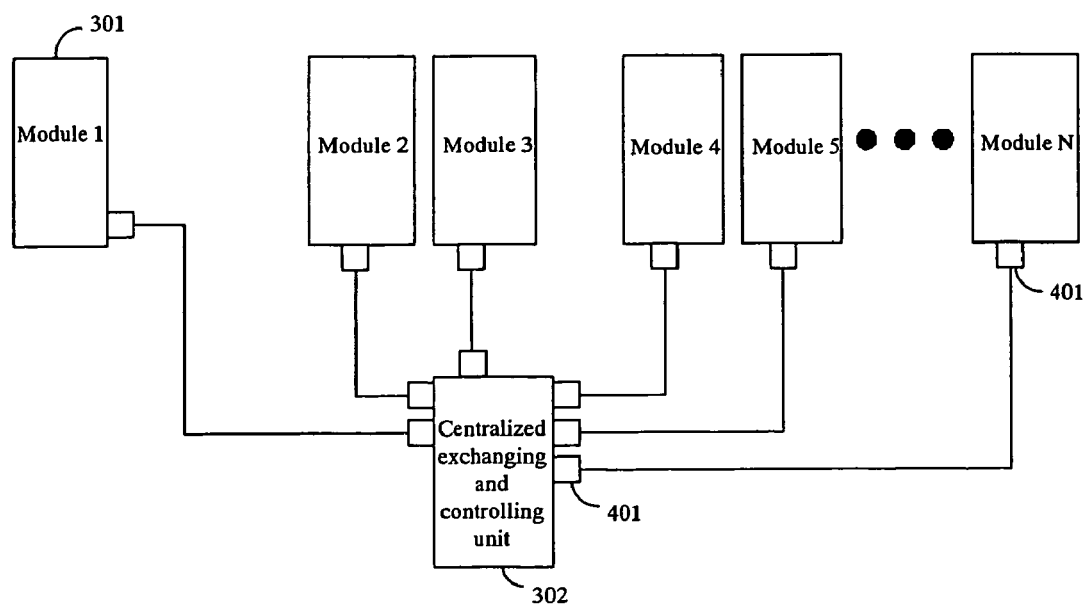
FIG. 4 shows an implementation structure diagram of the invention.

FIG. 4 shows an implementation diagram of the invention. In this diagram, there are the modules 301, the centralized exchanging and controlling unit 302 and the communication control interfaces 401 that are individually located on each module 301 and the centralized exchanging and controlling unit 302. Each module 301 takes its interface 401 to connect with the centralized exchanging and controlling unit 302, and communicates each other through the centralized exchanging and controlling unit 302. Taking the communication between modules 1 and 3 as an example, the specific communication procedure is as follows: through the interface 401, the module 1 transmits a message with the module 3 address to the centralized exchanging and controlling unit 302; the centralized exchanging and controlling unit 302 receives the message through the interface 401; after processing, the centralized exchanging and controlling unit 302 forwards the message to the destination module 3.

In fact, the invention takes the thought of forming net in a local area network to the internal communication of device, and the centralized exchanging and controlling unit servers as the central network unit, other modules communicate each other through the centralized exchanging and controlling unit, therefore, the centralized exchanging and controlling unit may take the HUB structure or SWITCH structure to perform its functionalities.

Figure 5:
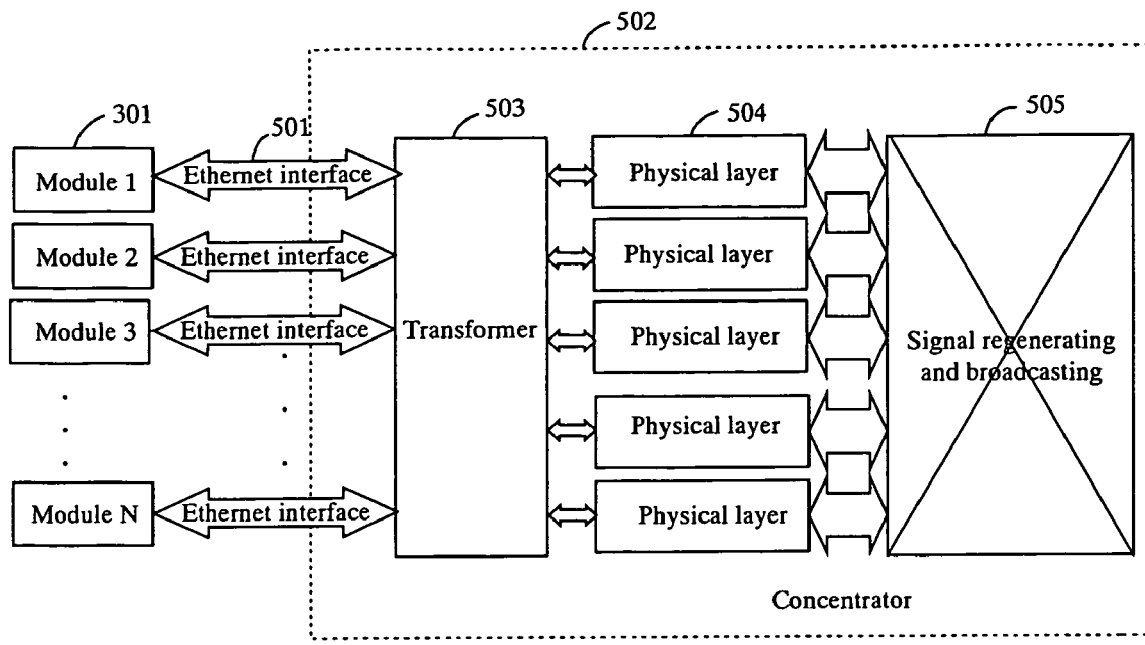
FIG. 5 shows principle diagram of an embodiment in the invention.

When applying a HUB as the centralized exchanging and controlling unit, the connection between the HUB and the modules is the same as the connection shown in FIG. 4, the only difference is that the HUB substitutes the centralized exchanging and controlling unit 302 and the 10M or 100M Ethernet interface substitutes the interface 401; FIG. 5 shows the detail implement procedure. In FIG. 5, the Ethernet interface 501, which is leaded from every module 301 that need to communicate, is connected to the HUB 502 through the backplane circuit; and the HUB 502 comprises: the transformer 503, the physical layer 504 and the message regenerating and broadcasting unit 505. Taking communication between the module 1 and the module 3 as an example which 10M Ethernet interface 501 is applied, the communication procedure is as follows: the module 1 sends a message with the module 3 address to the HUB 502 through 10M Ethernet interface 501; in the HUB 502, the message passes the transformer 503, which makes isolation and impedance transformation, and the physical layer 504, which implements the carrier interception, code conversion and collision detect; and then the message enters the regenerating and broadcasting unit 505 that makes message amplification, shaping; and then the message is sent to every module 301 through the physical layer 504, the transformer 503 and the Ethernet interface 501. When the message is coming, every module 301 compares the destination address in the message and its address; if the two addresses are different, the message is rejected; when the message is coming to the module 3, and the two addresses are identical as a result of the comparing, the module 3 receives the message. The communication between other modules 301 in device is also as described above. In the above communication procedure, each module 301 needs to know its address because the HUB 502 cannot implement the function of recognizing address and storing so as to implement the communication with the modules 301 in the manner of broadcasting; in this embodiment, it is implemented by setting state on the address pins of a module with backplane circuit to preset each module address uniquely, every module gets its address from the current state on the address pins, wherein every module has its unique address pins.

Figure 6:
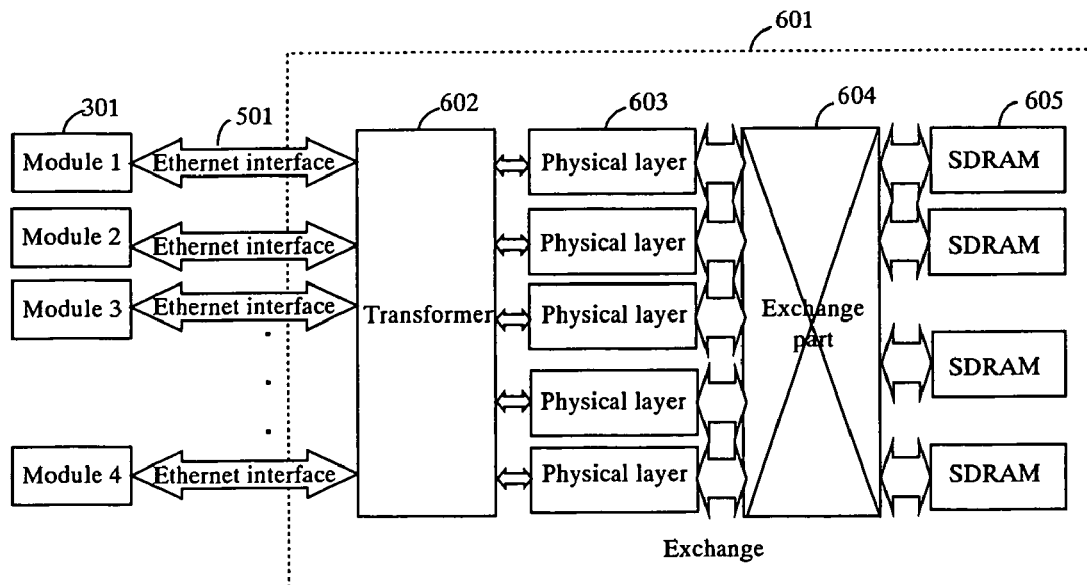
FIG. 6 shows principle diagram of another embodiment in the invention.

In order to transmit easily and support the communication between more modules, a SWITCH structure severs as the centralized exchanging and controlling unit in FIG. 4. The connection between the SWITCH and the modules is the same as the connection shown in FIG. 4, the only difference is that the SWITCH substitutes the centralized exchanging and controlling unit 302 and the Ethernet interface 501 substitutes the interface 401; FIG. 6 shows the implement procedure. In FIG. 6, every module 301 is connected with the SWITCH 601 through the Ethernet interface 501, and the SWITCH 601 is a two layers exchange that includes: the transformer 602, the physical layer 603, the exchange part 604 and the Synchronous Dynamic RAM (SDRAM) 605. The transformer 602 and the physical layer 603 have the same functions as the transformer 503 and the physical layer 504 in the FIG. 5. The exchange part 604 mainly performs the address self-learning function and the packet exchange function, and the SDRAM 605 stores an address table and the packets. Suppose the embodiment takes a 10M Ethernet interface 501, and when taking communication between the module 1 and the module 3 as an example, the communication procedure is as follows: a message with module 3 address is sent from the module 1; the message passes the 10M Ethernet interface 501, the transformer 602, the physical layer 603 and enters the exchange part 604 in which the message is packed and exchanged, and then the packet and the address table are stored in the SDRAM 605; after that it is waiting for an idle output line; once there is an idle line, the message packet is sent out by the SDRAM 605 along the path: the exchange part 604, the physical layer 603, the transformer 602 and the Ethernet interface 501. What difference with the HUB 502 is that the SWITCH 601 can process messages of multiple modules 301 simultaneously and has self-learning ability: once the message is processed by the SWITCH 601, the exchange part 604 will store the address of the processed message in the SDRAM 605 automatically. Therefore, when the module 301 is a destination module of a message for the first time, the exchange part 604 of the SWITCH 601 store the address of the destination module, when processing later, according to the address table stored in the SDRAM 605, the message can be sent to the corresponding destination module directly by the SWITCH 601. When a module is a destination module of a message for the first time, the SWITCH 601 broadcasts the message to all modules 301 to find out which one matches the destination module in the message, and the procedure is same as those in the embodiment of the FIG. 5.

The advantages of using SWITCH are that the SWITCH has better utility of bandwidth and supports multiple modules communication simultaneously, and the advantages of using HUB are low cost, simple and reliable.

All mentions above are some better embodiments, and they do not limit the protection scope of the invention.

The invention claimed is:

1. A method of realizing communication between modules of a system device, wherein a centralized exchanging and controlling unit is set in the system device and connected with each module of the system device separately through a respective communication control interface of each module, the method comprising:

before communicating between the modules, presetting a state of address pins of each of the modules, each of the modules getting its own address by reading the current state of its own address pins;

when communicating between the modules, sending a message carrying a destination address to the centralized exchanging and controlling unit by a source module, processing the message by the centralized exchanging and controlling unit, and forwarding the processed message to a destination module by the centralized exchanging and controlling unit according to the destination address, wherein the destination address is an address of the destination module obtained by reading the current state of the address pins of the destination module, and the centralized exchanging and controlling unit comprises:

a transformer for making isolation and impedance transformation, a physical layer for implementing carrier interception, code conversion and collision detect, and a message regenerating and broadcasting unit for making message amplification and shaping, wherein the message is processed by passing the transformer, the physical layer and the message regenerating and broadcasting unit.

2. The method according to the claim 1, wherein said processing the message and forwarding the processed message to the destination module according to the destination address comprises:

broadcasting the message by the centralized exchanging and controlling unit to all the modules in the system device;

once receiving the message, comparing the destination address carried in the message with its own address by each of the modules in the system device, and if the two addresses are identical, receiving the message by the module.

3. The method according to the claim 1, wherein said presetting the state of address pins for each of the modules comprises:

presetting the state of address pins in each module by setting an voltage state on a backplane circuit.

4. The method according to the claim 1, wherein said processing the message and forwarding the processed message to the destination module by the centralized exchanging and controlling unit according to the destination address comprises:

sending the message from the source module to the destination module directly through exchanging by the centralized exchanging and controlling unit.

5. A device for realizing communication between modules, comprising:

a plurality of modules configured to communicate with each other within the device, wherein a state of address pins of each of the plurality of modules is preset for the module, wherein each of the plurality of modules gets its own address by reading an current state of its own address pins before communicating with another of the plurality of modules; and a centralized exchanging and controlling unit, connected with each of the plurality of modules of the system device separately through a communication control interface of the module, and configured to receive a message carrying a destination address transmitted from a source module among the plurality of modules, process the message and forward the processed message to a destination module among the plurality of modules according to the destination address, wherein the destination address is an address of the destination module obtained by reading the current state of the address pins of the destination module, and the centralized exchanging and controlling unit comprises:

a transformer for making isolation and impedance transformation, a physical layer for implementing carrier interception, code conversion and collision detect, and a message regenerating and broadcasting unit for making message amplification and shaping, wherein the message is processed by passing the transformer, the physical layer and the message regenerating and broadcasting unit.

6. The device according to the claim 5, wherein the centralized exchanging and controlling unit broadcasts the message to all of the plurality of modules in the device;

each of the plurality of modules compares the destination address carried in the message with its own address in the device, and if the two addresses are identical, receives the message.

7. The device according to the claim 5, wherein the state of address pins in each of the plurality of modules is preset by setting a voltage state on a backplane circuit.

8. The device according to the claim 5, wherein the centralized exchanging and controlling unit sends the message from the source module to the destination module directly through exchanging.

9. A method of realizing communication between modules of a system device, wherein a centralized exchanging and controlling unit is set in the system device and connected with each module of the system device separately through a respective communication control interface of each module, the method comprising:

before communicating between the modules, presetting a state of address pins of each of the modules, each of the modules getting its own address by reading the current state of its own address pins;

when communicating between the modules, sending a message carrying a destination address to the centralized exchanging and controlling unit by a source module, processing the message by the centralized exchanging and controlling unit, and forwarding the processed message to a destination module by the centralized exchanging and controlling unit according to the destination address, wherein the destination address is an address of the destination module obtained by reading the current state of the address pins of the destination module, and the centralized exchanging and controlling unit includes a transformer for making isolation and impedance transformation, a physical layer for implementing carrier interception, code conversion and collision detect, an exchange part for packing and exchanging the message, and a Synchronous Dynamic RAM for storing a packet and an address table, wherein the message is processed by passing the transformer, the physical layer, the exchange part and the Synchronous Dynamic RAM.

10. The method according to the claim 9, wherein said processing the message and forwarding the processed message to the destination module according to the destination address comprises:

broadcasting the message by the centralized exchanging and controlling unit to all the modules in the system device;

once receiving the message, comparing the destination address carried in the message with its own address by each of the modules in the system device, and if the two addresses are identical, receiving the message by the module.

11. The method according to the claim 9, wherein said presetting the state of address pins for each of the modules comprises:

presetting the state of address pins in each module by setting an voltage state on a backplane circuit.

12. The method according to the claim 9, wherein said processing the message and forwarding the processed message to the destination module by the centralized exchanging and controlling unit according to the destination address comprises:

sending the message from the source module to the destination module directly through exchanging by the centralized exchanging and controlling unit.

13. A device for realizing communication between modules, comprising:

a plurality of modules configured to communicate with each other within the device, wherein a state of address pins of each of the plurality of modules is preset for the module, wherein each of the plurality of modules gets its own address by reading an current state of its own address pins before communicating with another of the plurality of modules; and a centralized exchanging and controlling unit, connected with each of the plurality of modules of the system device separately through a communication control interface of the module, and configured to receive a message carrying a destination address transmitted from a source module among the plurality of modules, process the message and forward the processed message to a destination module among the plurality of modules according to the destination address, wherein the destination address is an address of the destination module obtained by reading the current state of the address pins of the destination module, and the centralized exchanging and controlling unit includes:

a transformer for making isolation and impedance transformation, a physical layer for implementing carrier interception, code conversion and collision detect, an exchange part for packing and exchanging the message, and a Synchronous Dynamic RAM for storing a packet and an address table, wherein the message is processed by passing the transformer, the physical layer, the exchange part and the Synchronous Dynamic RAM.

14. The device according to the claim 13, wherein the centralized exchanging and controlling unit broadcasts the message to all of the plurality of modules in the device;

each of the plurality of modules compares the destination address carried in the message with its own address in the device, and if the two addresses are identical, receives the message.

15. The device according to the claim 13, wherein the state of address pins in each of the plurality of modules is preset by setting a voltage state on a backplane circuit.

16. The device according to the claim 13, wherein the centralized exchanging and controlling unit sends the message from the source module to the destination module directly through exchanging.

* * * * *